Oct. 27, 1942.　　　R. W. SPEISER　　　2,299,859
MULTIPLE UNIT POWER LAWN MOWER
Filed Sept. 3, 1940　　　6 Sheets-Sheet 1

INVENTOR
RALPH W. SPEISER
BY Paul, Paul & Moore
ATTORNEY

Oct. 27, 1942.  R. W. SPEISER  2,299,859
MULTIPLE UNIT POWER LAWN MOWER
Filed Sept. 3, 1940.  6 Sheets-Sheet 2
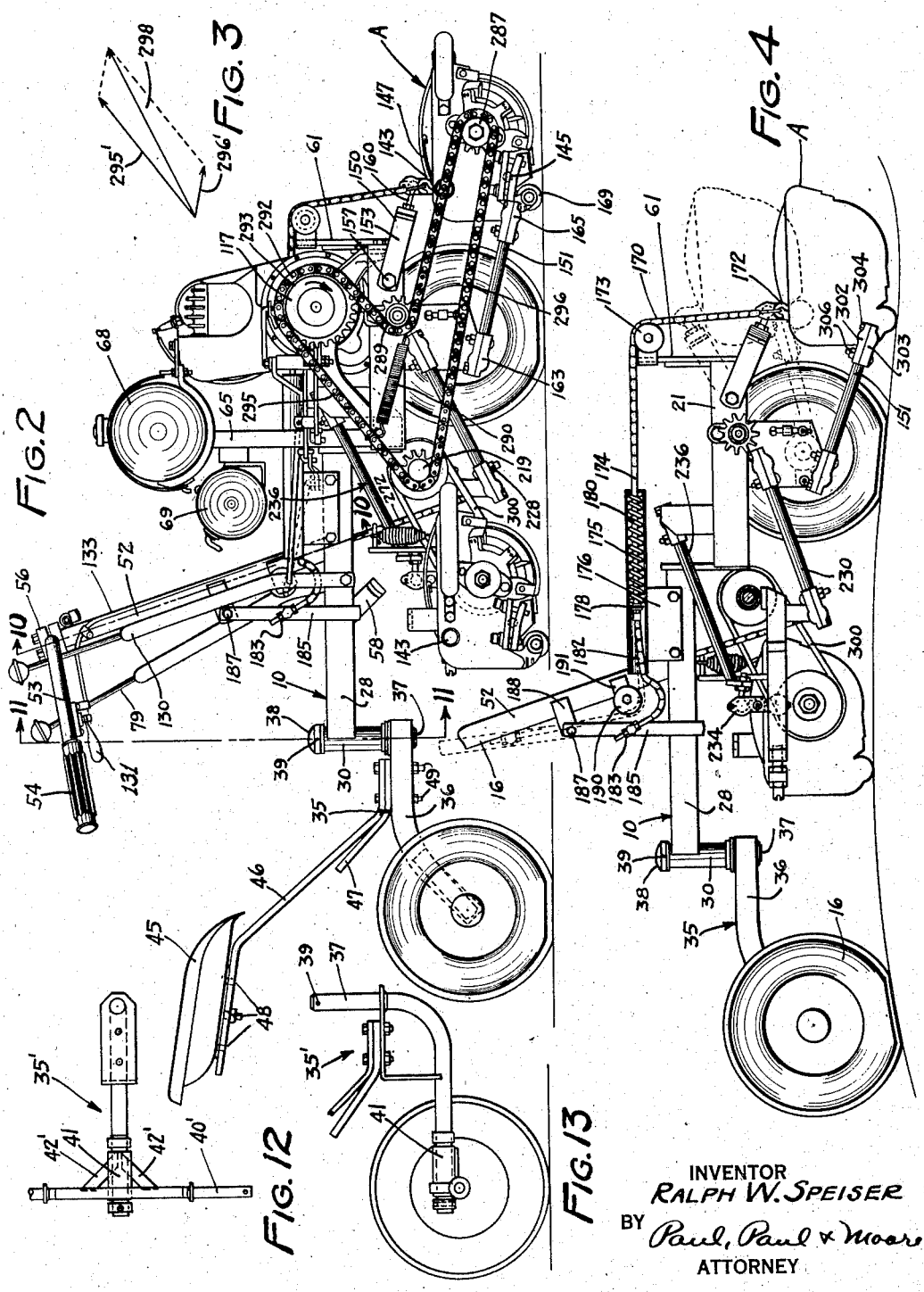
INVENTOR
RALPH W. SPEISER
BY Paul, Paul & Moore
ATTORNEY

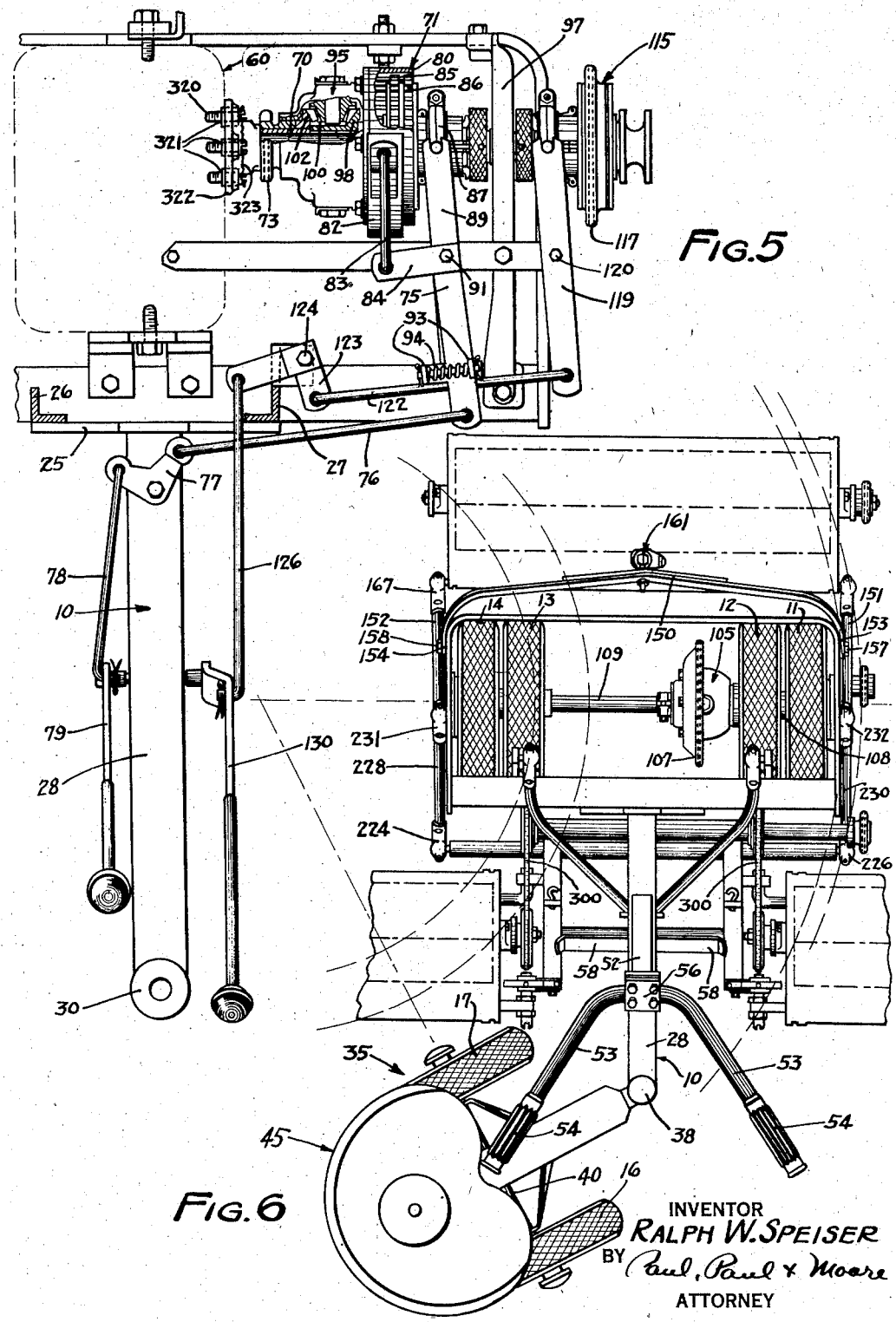

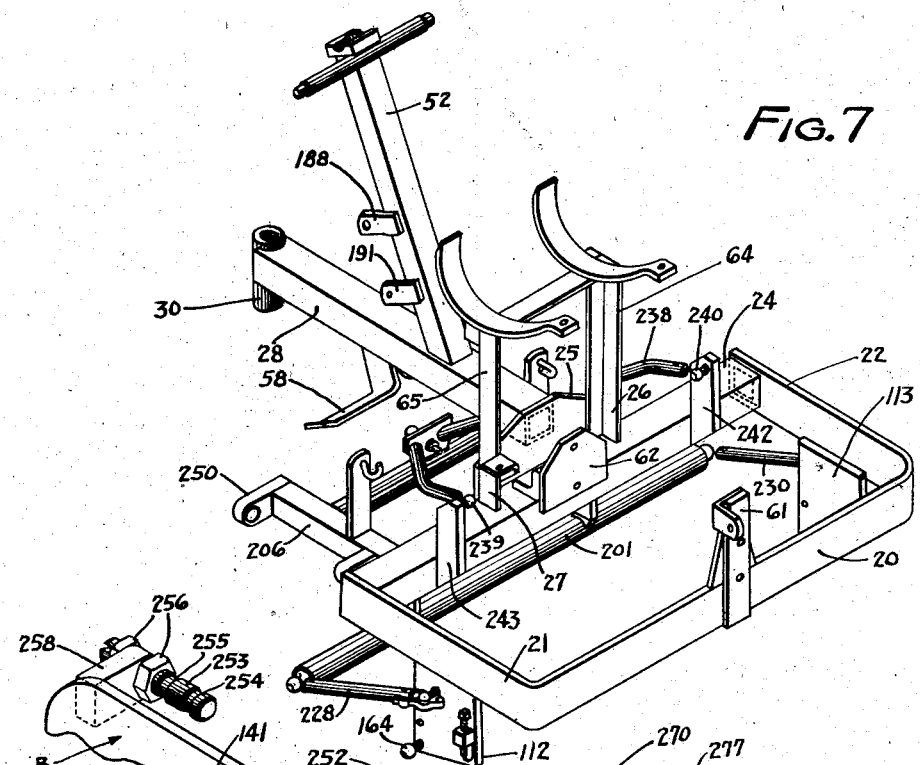
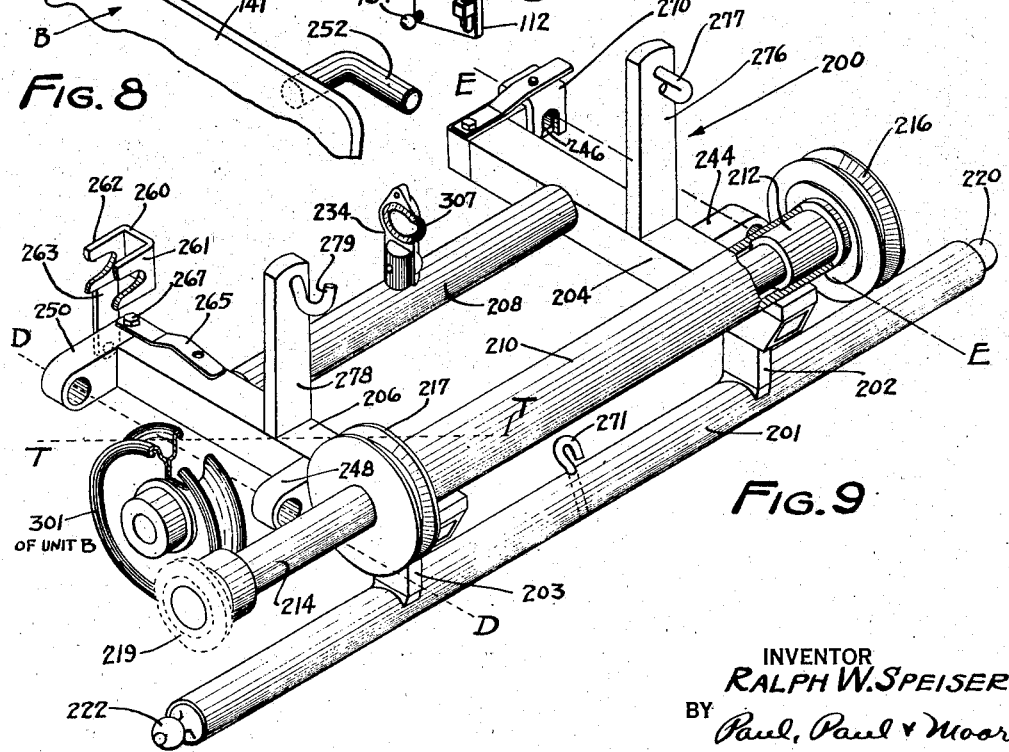

Oct. 27, 1942.  R. W. SPEISER  2,299,859
MULTIPLE UNIT POWER LAWN MOWER
Filed Sept. 3, 1940  6 Sheets-Sheet 5
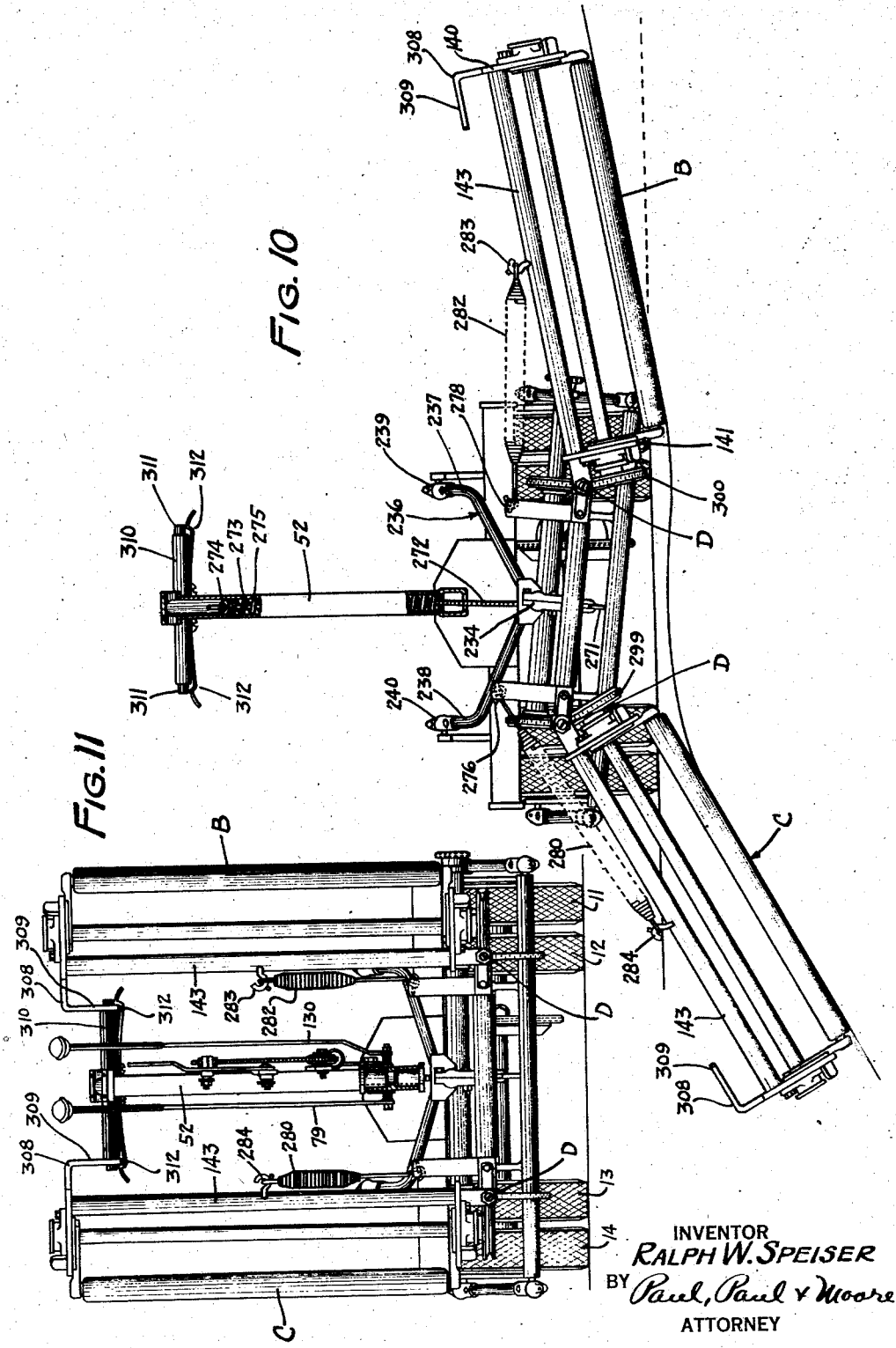
INVENTOR
RALPH W. SPEISER
BY Paul, Paul & Moore
ATTORNEY

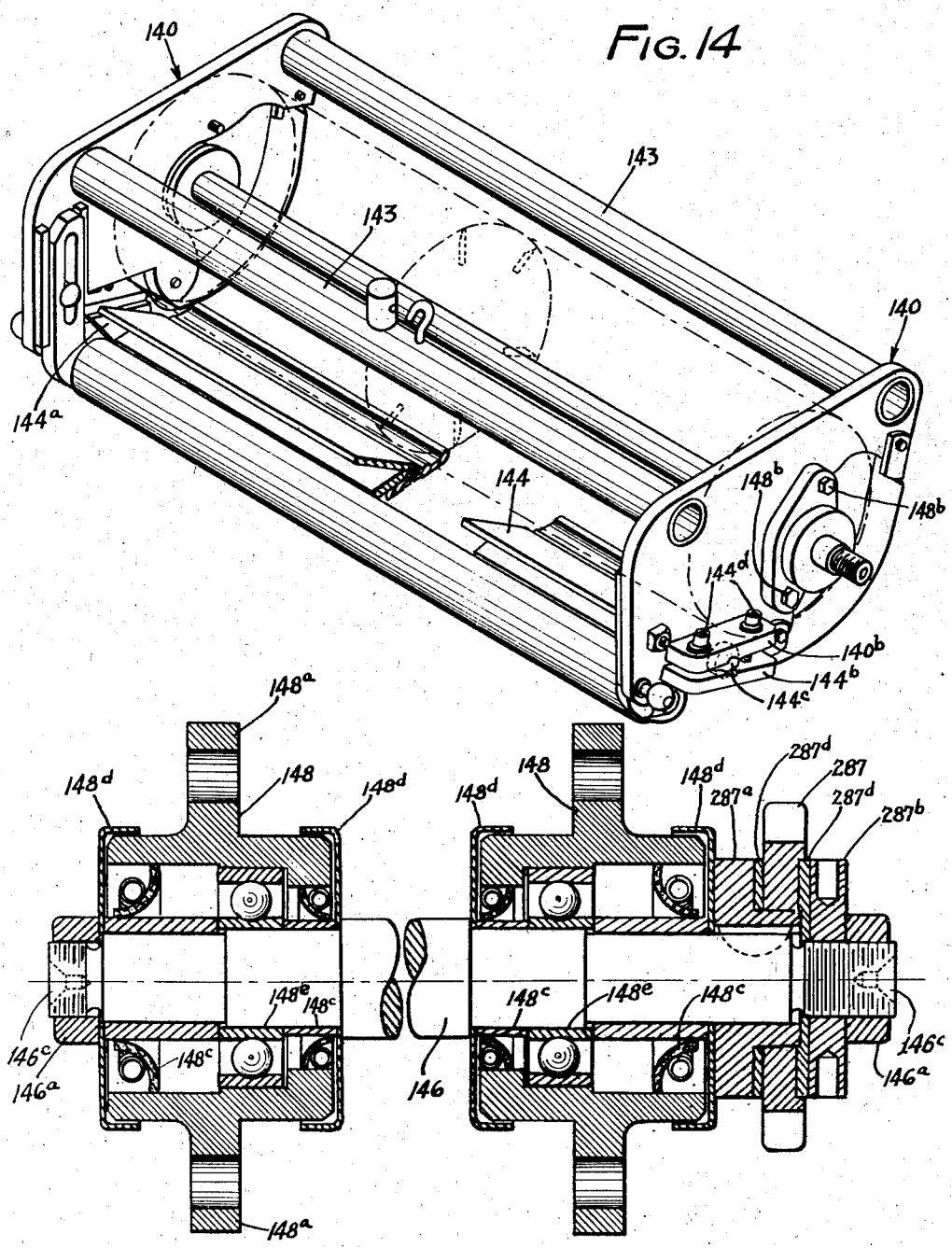

Patented Oct. 27, 1942

2,299,859

UNITED STATES PATENT OFFICE 2,299,859

MULTIPLE UNIT POWER LAWN MOWER

Ralph W. Speiser, Minneapolis, Minn., assignor to Toro Manufacturing Corporation of Minnesota, Minneapolis, Minn., a corporation of Minnesota Application September 3, 1940, Serial No. 355,171

24 Claims. (Cl. 56—7)

This invention relates to an improved multiple mowing unit traction mowing machine, and more particularly to a machine in which the mowing units are grouped in overlapping relationship about a small and compact traction vehicle, and the mowing elements of each unit operated from the power source on the traction vehicle.

It is an object of the invention to provide a mowing machine having a relatively small main supporting frame, which has a width of only a small fraction of the total width of the swath cut.

It is a further object of the invention to provide in such a mowing machine, provision for carrying the operator of the machine and to provide an articulated frame whereby the weight of the operator may be shifted to steer the machine.

It is another object of the invention to provide for reverse drive of the traction unit so that the entire unit may be backed out of restricted spaces.

It is a further object of the invention to provide a machine in which the mowing units are pivotally carried by the main traction frame with a large proportion of the weight of the unit transferred to the frame.

It is also an object of the invention to provide articulated connections between the mowing units and frame combined with means transferring a large proportion of unit weight to the frame, in such manner that play in the articulated connections does not sacrifice flexibility.

It is another and a particular object of the invention to provide a mowing machine in which the mowing units may operate with full power throughout very wide angles with respect to the position of the main propelling frame, and to provide in such a structure a novel power transmission system between the mowing units and the frame whereby adequate power is always available at the cutting reels.

It is another object of the invention to provide for a substantially constant transfer of mower unit weight to the main frame regardless of the angular position of the mowing units with respect to the frame, and to provide for positioning the mowing units during transport.

It is another object to provide a sub-frame articulately connected for vertical and oscillatory movements in a transverse plane, and adapted for the connection thereto of a multiplicity of mowing units by pivotal means extending in the direction of travel.

Finally, it is an object of the invention to provide bumper surfaces positioned on the mowing unit so that injury to monuments, trees, etc., is prevented, when mowing in cemeteries, parks, or the like.

Other and further objects of the invention are those inherent in the structure illustrated, described and claimed herein.

The apparatus of this invention is illustrated with respect to the drawings in which:

Figure 2 is a right elevation of the power mower in its entirety.

Figure 3 is a diagram of forces which illustrates the determination of sub-frame connecting link positions.

Figure 4 is a right elevation of the power mower with parts removed and parts broken away.

Figure 5 is a partial top view of the machine showing the control and power drive mechanism.

Figure 6 is a top view of the machine with the control and power drive mechanism removed.

Figure 7 is an isometric view showing the sub-frame linkage with, and position with respect to, the main frame.

Figure 8 is an isometric view of a portion of a wing mowing unit which illustrates its manner of pivotal attachment to the sub-frame.

Figure 9 is an isometric view of the sub-frame which illustrates the wing mowing unit pulley position with respect to its cooperating sub-frame drive pulley and also the latching means for locking the wing mowers in pivoted relation with the sub-frame.

Figure 10 is a rear view of the machine as viewed along the lines 10—10 of Figure 2, parts being removed and parts left out.

Figure 11 is a rear view of the machine as viewed along the lines 11—11 of Figure 2, parts being removed and parts left out.

Figure 12 is a plan view of an alternate construction for the undercarriage of the trailing unit 35.

Figure 13 is a right elevation of the trailing unit construction shown in Figure 12.

Figure 14 is an isometric view with some of the parts removed and others broken away showing one of the cutting units of the assembly.

Figures 15a and 15b are fragmentary views in section of the two bearing units of the reel shaft.

Throughout the drawings, identical parts are indicated by the same numerals.

*The tractor frame and steering structure*

Figure 1:
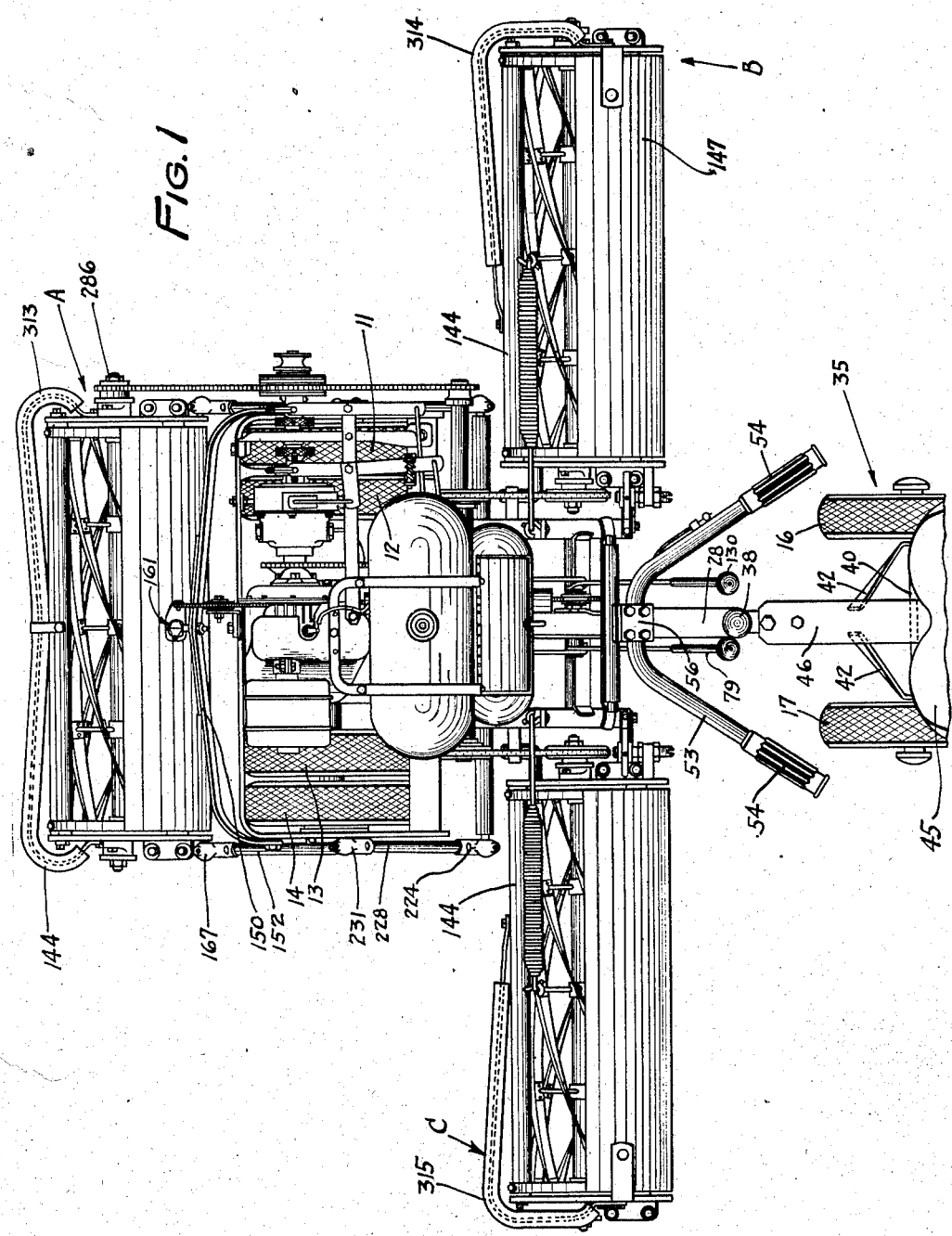
Figure 1 is a top view of the power mower in its entirety.

The traction and transport vehicle is a four-wheeled apparatus comprising a frame, generally designated 10, having two pairs of dual forward driving wheels 11—12 and 13—14, and a trailing set of tandem wheels 16 and 17. The main frame structure is best illustrated in Figure 7. The frame consists of a forward cross-piece 20, which is preferably integrally formed with rearwardly extending side pieces 21 and 22. The side pieces 21 and 22 are joined together by a central transverse frame member 24, which is preferably of tubular cross section welded to the side pieces 21 and 22. At the middle of the central transverse frame 24, there is an upwardly extending gusset plate 25, which is strongly braced by means of angle pieces 26 and 27 (see Figures 5 and 7), and extending rearwardly from gusset plate 25, there is a central frame member 28, which is likewise preferably of tubular cross section. At the rear end of the central frame member 28, there is formed a vertical pivot post 30 which serves as a coupling for the trailing unit, generally designated 35.

The trailing unit 35 consists of a central frame 36 having a forward upwardly extending pivot pin 37, which is received in the pivot post 30 (see Figures 1 and 2). The pivot pin 37 is provided with a cap 38 which is held in place by a through pin 39, of small diameter. Accordingly, the trailing unit 35, as a whole, is permitted to pivot with respect to the main frame 10.

The trailing unit 35 is provided with an axle 40 on which are mounted wheels 16 and 17 previously mentioned. In the alternate construction (Figures 12 and 13) axle 40' is engaged by longitudinal pivot 41 for vertical oscillation in a transverse plane. Extending above the frame 36 of the trailing unit, there is a driver seat 45, which is adjustably mounted upon the spring arm 46 by bolting through one of the holes 48. An overload spring 47 is interposed between the spring arm 46 and the main frame member 36 so as to give added strength for heavy operators, the whole seat unit being mounted upon the frame 36 by through bolts 49.

Extending upwardly from the central frame member 28, there is a fixed steering column 52, upon which rearwardly extending handle bars 53 are mounted equipped with handle grips 54. The whole handle bar unit is adjustably coupled to the fixed steering column 52 by means of the clamp 56 so that the position of the handle bars may be adjusted for height. Extending downwardly from the central frame member 28 are a pair of foot rests 58, which may, if desired, be adjustably mounted.

Steering of the unit 35 with respect to the frame 10 is accomplished by the reaction upon seat portion 45 of the trailer unit 35 when the operator exerts pressure upon the handle bars 53 and foot rest 58 on the main frame member 10 to swing the unit 35 about pivot post 30. Hence, as the vehicle proceeds, steering is accomplished by the operator swinging the seat 45 and unit 35 to the right or to the left. Since the operator's seat 45 is farther away from the pivot post 30 than wheels 16, reactive steering force of the operator upon seat 45 is to some extent multiplied and easy steering is accomplished. Hence, it is possible easily to achieve the extreme steering positions, one of which positions is shown in Figure 6. In this position, the overlapping relation of the swaths cut by mowing units A, B and C is indicated by the dotted curved lines. The amount of overlap of the swaths is equal for straight forward mowing and is made sufficient so that there will always be overlap even on curves.

*Power source and power transmission*

At the forward central part of the main frame, there is mounted a primary power source, generally designated 60, this being preferably a one or two cylinder air-cooled gasoline engine. The engine is carried between the forward bracket 61, which is at the middle of the forward cross piece 20 of the frame, and the rear engine bracket 62, which is centrally mounted on the central transverse frame member 24. Frame member 24 likewise carries a pair of vertical posts 64 and 65, upon which the gasoline tank 68 and tool hatch 69 of the engine are mounted. Vertical posts 64 and 65 are the previously named angle bracket pieces 26 and 27, in fact, they are bent of one piece of angle iron forming a U-member.

The drive shaft of the engine is at the right-hand side of the unit, as shown in Figures 1 and 5, the drive shaft being indicated at 70. Upon the drive shaft, there is mounted a reverse gear, generally designated 71, of any conventional type, the driven or output side of the gearing being the chain sprocket 73.

The reversing mechanism illustrated has forward, neutral and reverse conditions of operation, which may be selectively attained by means of the gear shifting lever 75, connected by means of link 76, bell crank plate 77, link 78, to the shifting lever 79, the latter being mounted conveniently with reference to the operator station, for pivotal forward and reverse movement on the left side of the fixed steering column 52. The shifting mechanism is best illustrated in Figures 5 and 11.

The forward and reverse transmission herein illustrated, comprises a drum member 80, upon the outer surface of which there is mounted a brake band 82 controlled by the link 83 coupled to the side arm 84 of lever 75. On the inner surface of the drum member 80, there is provided a splined surface 85 in which a plurality of driven clutch plates are arranged to operate, these being in cooperating relation with other clutch plates splined in the drive shaft. The clutch plates are shifted from disengaging to engaging position by means of the thrust bearing 87 operated by under lever 89, the latter, as well as lever 75, being pivoted upon bolt 91. The two levers 89 and 75 are resiliently coupled together for slight relative movement under stress, by a pair of upwardly extending lugs 93 and spring 94.

Studs 320 are circumferentially spaced about the power take-off shaft (not shown) of the engine 60 and secured for rotation therewith. Rollers 321 slidably mounted on the studs 320 are also journaled in apertures circumferentially formed in a flange 322 secured to the inner end of shaft 70. By means of the above coupling, the shaft 70 is permitted to shift laterally of the frame to an extent limited by the length of the rollers 321 which are held in place on the studs 320 by a wire 323 threaded through holes in the ends of the studs. The drum member 80 is bolted to the housing of a planetary gearing, generally designated 95.

Power transmission from the engine 60 to the sprocket 73 under forward drive conditions is as follows:

Drive shaft 70 extends from a coupling with the engine 60 through the entire planetary gearing 95, and brake-clutch unit 71 through a side frame member 97, where it is journaled, and always revolves in a clockwise direction as viewed in Figure 2. When the shift lever 79 is moved forwardly, it serves through the links 76 and 78, and the lever 75, to disengage the brake band 82 and to engage the clutch members 86. This results in the shaft 70 driving the drum 80, which in turn revolves the casing of the planetary gearing 95.

Within the planetary gear housing, there is a pinion gear 98 keyed to the shaft 70, this gear being revolved with the shaft at all times. Since gear 98 is revolved with the shaft and the housing of the planetary gearing 95 is likewise revolved at the same speed as the shaft 70, this serves through the planet gears 100 to drive the pinion gear 102, which is journaled upon the shaft 70 and solidly coupled to the chain sprocket 73 outside of the housing. Accordingly, the sprocket 73 is driven in the forward direction.

When the lever 79 is pulled backwardly by the operator, the control levers 75 and 89, being flexibly coupled together, are both moved in the clockwise diection as viewed in Figure 5. This serves to disengage the driving connection between the clutch discs 86 and the drum 80 and serves to tighten the brake band 82 upon the outer surface of the drum, the spring 94 insuring that both brake and clutch are completely operated. When this occurs, power is transmitted to the sprocket 73 in a reverse direction as follows:

Shaft 70 rotates pinion gear 98. Since the housing of planetary gearing 95 is now stationary due to the holding action of brake 82, the planet gears 100 revolve upon their stub shafts and serve to rotate the pinion gear 102 in a reverse direction.

When the lever 79 is moved to an intermediate position, both the clutch members 86 and the brake member 82 are disengaged. When this occurs, the drum member 80 and the housing of planetary gearing 95 revolve at half speed as compared to the engine speed and does not transmit power either in the forward or the reverse direction.

Immediately below the chain sprocket 73, there is positioned a differential, generally designated 105, having a large outer chain sprocket 107. The internal construction of the differential 105 is generally similar to that used in automotive construction, although somewhat smaller, and is mounted upon and drives dual wheels 11—12 and 13—14, which are mounted on axle 109. The outer ends of axle 109 are carried upon downwardly extending gusset plates 112 and 113, best illustrated in Figure 7.

Accordingly, the engine 60 may be used to propel the vehicle in either the forward or rearward direction, or the vehicle can be caused to remain immovable, by suitable manipulation of the control lever 79.

The main drive shaft 70 extends outwardly beyond the right-hand side of the frame members 97 as shown in Figure 5, and upon the outer end there is mounted a clutch unit, generally designated 115, having an outer chain drive sprocket 117. The clutch member 115 is of any desired type and is controlled by a lever 119 pivoted to the frame member 97 at bolt 120. The lever 119 is arranged to be operated from the driver's position by means of links 122, which are coupled to the bell crank 123, the bell crank being pivoted at bolt 124. The bell crank 123 is moved upon its pivot by the link 126 which is coupled to the control lever 130. When the lever 130 is moved, the bell crank 123 is moved so as to rotate the lever 119 in the clockwise direction thereby shifting the clutch 115 to the power transmitting position. The power take-off sprocket 117 serves to drive the revolving reels of the cutting units by means which will be described hereinafter.

Upon the right-hand handle bar 53, there is mounted a speed control lever 131, which is connected by a wire 133 to the engine 60. It is, therefore, possible for the operator, when seated at 45, to not only control the forward and rearward motion of the mower, but also to control the speed of operation and to control the rotation of the cutting reels of the mower units.

Mowing unit A

About the main drive vehicle, there are positioned three (3) moving units, generally designated A, B and C as shown in Figure 1. The mowing units are of generally similar construction except so far as the power drive connections are concerned, units B and C being an enantiomorphic pair, otherwise identical.

Each of the mowing units consist of side frame plates 140, which are connected together by two or more intermediate frame members 143, and by the bed knife 144. The frame members, 143, are preferably of tube steel welded to the side plates 140.

The knife bar 144 is preferably made of steel plate, grooved and bent along the groove so as to close the groove and form a V-shaped bar. The knife bar may if desired be an integral rolled steel bar of the shape shown, rather than the folded bar illustrated. At the ends of the bar there are welded gusset plates, 144a, to which in turn there are welded outwardly extending plates, 144b, one at each end of the knife bar. Upon the unit side plates there are welded outwardly extending brackets, 140b, which overlie plates 144b when the knife bar is assembled on the unit. The under sides of brackets 140b and the upper sides of plates 144b are milled with a circular cutter, and a circular disc key 144c is inserted and the whole held in place by adjusting screws 144d which pass thru brackets 140b and are threaded into plates 144b. The axis of pivoting of the bar is the centre of disc keys 144c. The keys, in addition serve positively to prevent endwise movement of the bedknife 144 with reference to each side plate and as a result, the knife bar serves not only as a support for the bed knife, but also as a frame stiffening member. The mowing units are accordingly very rugged and little subject to weaving. Extending upwardly over the rear portion of each unit, there is a grass shield 147, which may also serve to stiffen the frame of the mowing unit.

The reel of the cutting unit, together with the bearings upon which the reel revolves, are detachable as an assembly from the cutting unit frame, this being illustrated in Figures 14, 15a and 15b. Each end of the reel shaft 146 projects through a bearing housing 148. The housing 148 has an apertured flange 148a thru which cap screws 148b pass for fastening the housings to the unit frame. The housings 148 are bored to receive ball bearing units 148e and oil seals 148c. The shaft, 146, also carries slinger cups 148d which embrace each side of the housing. The slinger cups serve to exclude tough grass and wire from the oil seals 148c, thus enabling them to wear longer and function better.

The entire assembly of slinger cups 148d, oil seals 148c and bearings 148b are held assembled in the housings 148 by means of nuts 146a at each end of the shaft, and the exposed ends of the shaft 146 are provided with cone centers 146c, so that the reel may be set up accurately in a grinding machine for sharpening, all without dismantling the bearing units.

Referring now to the forwarding mowing unit A: The unit A is carried with respect to the traction vehicle by means of an upper U-shaped frame member 150 and a pair of lower side links 151 and 152. The U-shaped frame member 150 has its rearwardly extending spaced arms 153 and 154 coupled to the main frame side pieces 21 and 22 by means of pivot bolts 157 and 158. The front portion of the U-shaped frame member 150 may accordingly move forward and downward about an arcuate path, the center of which is formed by pivot bolts 157 and 158. Upon the front center part of the frame member 150, there is mounted the ball portion 160 of a ball and socket coupling, generally designated 161, the coupling 161 being in turn mounted upon the center part of the front mowing unit A.

The rear end of the right-hand lower side link 151 is coupled to the gusset plate 112 of the main frame by means of a ball and socket joint 163, the ball portion of which is shown at 164 in Figure 7. The front end of the lower side link 151 is coupled by a similar ball and socket joint 165 to the lower rear portion of mowing unit A. The left-hand lower side link member 152 is likewise coupled to the gusset plate 113, and to the mowing unit A by means of ball and socket joints 167.

Since the U-shaped frame 150 is pivoted to the frame at 157 and 158, it is prevented from moving sideways. Hence, the ball 160 of joint 161 serves to prevent the mower unit A from shifting laterally, although the unit A may tilt freely about an axis longitudinally of the machine, in conformance with ground contours. The tipping of unit A about an axis transverse of the machine is determined by the effective lengths of U-frame 150 and links 151 and 152. The effective length of U-shaped frame member 150 is less than the effective length of the lower side links 151 and 152, and accordingly, as the mower unit A moves upwardly and downwardly from the neutral positions of Figure 2, the mower unit A is tipped upwardly a slight amount at the front, this being illustrated in Figure 4. The upward tipping function is desirable so as to prevent the front end of the unit A from digging into the surface of the turf when mowing undulating surfaces.

A portion of the weight of the mowing unit A is carried by a roller 169 on the rear part of unit A, but the major portion of the weight is carried by means of a link chain 170 extending from the hook 172 on unit A upwardly over pulley wheel 173, and then backwardly into a rod 174, which extends into the tubular housing 175 mounted upon the gusset plate 176, the latter being in turn mounted upon the central frame member 28. The front part of the tubular housing 175 is closed except for a small hole through which the rod 174 passes, and the rod is provided with a rear collar 178. Between the collar 178 and the front end of housing 175, there is compressed a spring 180, which serves to carry about 85% of the weight of the mowing unit A, this being variable by adjusting the compression of spring 180. It is desirable thus to transfer the weight of the mowing units to the main chassis as the traction of the latter is thereby increased. The proportion of the mower unit weight carried by roller 169 is made just sufficient to maintain ground contact, this weight being insufficient to damage the turf during sliding of the unit on curves.

In order to elevate the mowing unit A during transporting conditions, there is provided link chain 182 extending from the rear end of rod 174 and thence to an adjustment member 183 pivoted to the lift lever 185. The lift lever 185 is coupled at pivot bolt 187 to the fixed plate 188 on stationary steering column 52. In Figures 2 and 4, the lever 185 is shown in full lines in the down position, under which conditions the rear link chain portion 182 is slack and the weight of the mower unit A is in part carried by the spring 180. When the lever 185 is rotated upwardly to the dotted line position shown in Figure 4, the link chain 182 is tensioned over fixed pulley 190, which is likewise pivoted upon the bracket 191 attached to the fixed steering column 52, and when thus tensioned, chain 182 takes the weight of mower unit A and relieves spring 180. When the lever 185 is in the dotted line position of Figure 4, it is over-center with respect to the mounting pivot 187, and accordingly is self-holding in the elevated position.

Mowing units B and C

The lateral mowing units B and C are not coupled directly to the traction transport vehicle, but are instead carried by a sub-frame member, generally designated 200, the details of which are best illustrated in Figure 9. The sub-frame member 200 consists of a front tubular bar 201 having upright pieces 202 and 203 welded thereon, at the upper ends of which, there are welded rearwardly extending side pieces 204 and 206, being preferably made of square steel tubing. An intermediate frame piece 208, preferably of round tubing, is welded to the rearwardly extending side pieces 204 and 206 and serves to stiffen the unit. Upon the front upper portion of the side pieces 204 and 206, there is welded a tube 210, which not only serves as a frame member, but also serves as a means for supporting a pair of journals 212, one in each end of the tube 210, in which the shaft 214 is rotatably mounted. The shaft 214 carries a pair of V-type pulleys 216 and 217 and at one end carries a chain sprocket shown in the dotted lines at 219 in Figure 9. The sprocket 219 is positioned so as to be in alignment with the chain drive sprocket 117.

At the outer ends of the front tubular bar 201, there are spherical heads 220 and 222 of ball and socket joints 224 and 226 respectively, the ball and socket joints 224 and 226 being carried upon the rear ends respectively of the lower rear side links 228 and 230, the front ends of these links being coupled by similar ball and socket joints 231 and 232 to the gusset plates 112 and 113 of the main tractor frame.

To the center part of the intermediate frame piece 208 of sub-frame 200, there is coupled a ball and socket joint 234, which serves to receive the spherical head portion of a ball and socket coupling forming the center of a Y-frame, generally designated 236. The forwardly extended spaced legs 237 and 238 of the Y-frame 236 are coupled to the main tractor frame by means of ball and socket joints 239 and 240, which are joined to the upwardly extending brackets 242 and 243, these latter being welded to the central transverse frame member 24.

It will, therefore, be observed that the sub-frame member 200 is mounted in a manner similar to that used in mounting the front mower unit A in that there is an upper central connection to the sub-frame member 200 at the ball and socket joint 234 and a pair of lower rear side links 228 and 230. The ball and socket joints 239 and 240, by which the bifurcated ends of the Y-frame 236 are joined to the main chassis, serve to prevent the frame from shifting laterally with respect to the chassis. Hence, ball and socket joint 234 on the Y-frame 236 serves to prevent lateral shifting of the sub-frame 200, although the sub-frame may tip freely about a longitudinal axis through the ball joint. The tipping of sub-frame 200 and mower units B and C attached thereto, about an axis transversely of the main chassis, is determined by the effective pivotal length of the Y-frame 236 and the side links 228 and 230, the effective length of the Y-frame 236 being somewhat longer than the effective length of the lower side links 228 and 230. As a result, the front portion of the sub-frame member 200 is tipped upwardly as the sub-frame moves above and below the neutral plane shown in Figure 2, the movement above the neutral plane being illustrated in Figure 4. This tipping action is transmitted directly to mower units B and C, which are mounted on the sub-frame 200.

Upon the rearwardly extended side piece 204 of the sub-frame 200, there are mounted pivot blocks 244 and 246, and upon side piece 206, there are mounted similar pivot blocks 248 and 250. Each of the pivot blocks is apertured along a rearwardly extending axis illustrated, for example, by the axis D—D of Figure 9. The apertures in pivot blocks 248 and 250 serve to receive pivot pins 252 and 253 respectively mounted on the inner side plate 141 of mower unit B (see Figure 8). The pivot pin 252 is merely a round piece of rod bent at an angle and welded to the side plate 141, but the pivot pin 253 is a turning having grooves 254 and 255 therein. The rod 253 is threaded so as to receive the locking nuts 256, pin 253 being mounted in the block 259 welded to the side plate 141.

The axis of pivot pins 252 and 253 is such that the pins may be slipped into the apertures in pivot blocks 248 and 250, and when thus in place the locking clip 260 is moved downwardly into place so that the bifurcated sides 261 and 262 slide into the grooves 254 and 255 respectively thus retaining the pin 253 in place in the aperture. This serves to prevent displacement of the mower unit B with respect to the sub-frame 200. Locking clip 260 is pivoted to the sub-frame by means of arm 263 and is held in locking position by means of a spring clip 265 which is likewise pivoted to the sub-frame and bolt 267, the spring clip 265 being swung over the locking clip 260 when the latter is in place as shown at 270 in Figure 9. The mowing units B and C can accordingly be removed from the sub-frame B merely by raising the clips 260 and 270.

At the center part of the front tubular bar 201, there is an eye 271 to which there is coupled a supporting link chain 272 (see Figures 2 and 10). The link chain 272 passes upwardly into the hollow stationary steering column 52, and is provided at its upper end with a rod portion 273 terminating in a washer at adjustment nut 274. The spring 275 surrounding the rod 273 is compressed when chain 272 is drawn downwardly by the weight of sub-frame 200 and mowing units B and C coupled thereto. In this manner, any downward force on the sub-frame 200 is transferred to the main traction vehicle.

Extending upwardly from side pieces 204 and 206 of sub-frame 200, there are brackets 276 and 278 having eyes 277 and 279 respectively thereon. The brackets 276 and 278 serve as attachment points for receiving tension springs 280 and 282, the outer ends of these springs being attached respectively to the center eyes 283 and 284 of mowing unit cross frame members 143. Accordingly, a proportion of the weight of each mowing unit B and C is transferred to the sub-frame 200 and from the sub-frame 200 to the traction vehicle by virtue of the link chain 272.

The length and attachment positions of springs 280 and 282 is such that the lifting torque on the mowing units B and C will be substantially equal to the downward torque caused by the weight of the units about their pivot axes, for it will be observed that the torque arm shortens and the downward torque caused by the weight of the unit accordingly decreases as the mowing unit inclines downwardly. This is illustrated in Figure 10 for mowing unit C, which is shown as resting on a downward slope. At the same time, the torque arm of spring 280 in respect to the pivot axis E is lessened as the mowing unit inclines downwardly, thereby substantially balancing the unit in all inclined positions. As the spring tension increases, the torque arm decreases, and vice versa.

In Figure 10, the mower C, being positioned on a downward incline, its supporting spring 280 is greatly tensioned. The spring 282 of mower B, which rests on an upward slope, is tensioned to a much lesser degree. However, a line passing through pivot axis D of mower C and perpendicular to the tensional force of spring 280 (torque arm) is shorter than a corresponding line through pivot axis D of mower B and perpendicular to the tensional force of spring 282. In fact, the torque which is the product of the unit length of the line and the force is equal in both cases, and is equal whatever be the position of mowers B and C with respect to each other to the sub-frame.

The proportion of the weight of units B and C, carried by the ground rollers of the units, is as in the case of unit A, just sufficient to maintain ground contact. This weight does not unduly depress the turf nor damage the turf during sliding on turns.

*The power drive for the mowing units*

The front mowing unit A is provided with a reel shaft 286 extending at the right-hand side of the unit as shown in Figure 1 upon which shaft, there is mounted a chain sprocket wheel 287. As shown in Figure 15b, the sprocket 287 is rotatably mounted on hub 287a which is keyed to the reel shaft 146 of unit A. Upon the end of the reel shaft there is threaded a clutch disc 287b. Between the sprocket 287 and clutch disc 287b, and also between the sprocket and the face of hub 287a there are positioned friction discs 287d. The disc 287b is drawn up so as to produce the desired clutch friction and is locked in place by nut 146a on the end of the reel shaft. Ordinarily sprocket drives the shaft 146 without slipping but should the reel becomes jammed by striking a stone or iron, or the like, the sprocket will slip, thus sparing the transmission mechanism from excessive strains.

Sprocket wheel 287 of unit A is positioned so as to be in alignment with the chain sprocket 117 (see Figures 1 and 5). Likewise, the chain sprocket wheel 219 on shaft 214 of sub-frame 200 is normally in alignment. During normal level running conditions, sprockets 117, 219 and 287 will be in the same vertical plane, but as the mower unit A and/or sub-frame 200 tips about longitudinal axes through the machine, slight misalignment occurs. However, within the limits of motion possible in the machine, this is not a detriment in view of the length of chain between the various sprockets and the inherent ability of the chain to operate satisfactorily in slight misalignment. In addition, the main frame of the machine is provided with an idler sprocket 289 mounted so as to be drawn rearwardly by means of spring 290. Over the driving sprocket 117 and the driven sprockets 219 and 287, there is arranged a drive chain 292. Since the rotation is clockwise in the direction of arrow 293, as shown in Figure 2, the maximum tension of the driving chain occurs in the portion 295 between sprockets 117 and 219 since this portion of the chain transmits the power for rotating the two rear units B and C and also that for rotating the forward unit A. If it is assumed that the power consumed by all of the cutting reels is equal, the tension in the portion 295 of the chain may be illustrated by the vector 295' of Figure 3, vector 295' being substantially three times as great as the vector 296', which is respective of the tension in that portion of the chain between sprockets 219 and 287. The tension between sprocket 287 and idler 289 and between the idler 289 and the drive sprocket 117 is considered as negligible in view of the fact that no load is carried in these portions of the chain, tension being maintained only by the action of spring 290. In the vector diagram of Figure 3, the direction of the vector 295' is laid out as parallel to the portion 295 of the drive chain, while the vector 296' is laid out parallel to the portion 296 of the chain, Figures 2 and 3 being referable, one to the other.

The vector sum of vectors 295' and 296' can accordingly be represented by the vector 298, which represents the total forward force to chain 295, upon the sub-frame 200 under normal level, evenly loaded, conditions. The position of the Y-frame 236 and the lower rear side links 228 and 230 is preferably made parallel to the vector 298 so that under normal level running, evenly loaded, conditions in the mower, the driving tensions of the chain drive will not produce any lifting or lowering of the sub-frame 200 and mowing units B and C attached thereto. The fact that the portion 295 of the driving chain is nearly equal in length to the average effective length of frame 236 and side links 228—230 preserves the nearly parallel relation between the resultant force 298 and frame and links 236—228 and 230 throughout a wide variety of positions of the sub-frame above and below the neutral plane.

Likewise, it will be observed that the U-shaped frame 150 and the lower right and left side links 151 and 152 are nearly parallel to the portion 296 of the chain. Therefore, the driving force in the chain produces no substantial elevation or depression of the mowing unit A under normal conditions. It has been found in actual practice that the links need not be out of parallel with the vector 298 but a few degrees to upset the operation. Obviously, uneven cutting conditions between the three mowers and displacements of the cutting units and sub-frame B above and below normal condition, to some extent affects the position of the cutting units, but it has been found that by arranging the apparatus as described above, superior results are obtained under a wide range cutting condition.

The cutting reel of unit A is driven directly by the chain 292, but units B and C are indirectly driven from the intermediate shaft 214 on sub-frame 200 by means of V-belts 299 and 300, which are arranged to operate over pulleys 216 and 217 respectively.

Referring particularly to Figure 9, it will be noted that the pulley 301 of mowing unit B is shown in the position maintained during normal level running conditions. The pitch line of the uppermost part of pulley 301 of unit B and the pitch line of the lower portion of pulley 217 are both tangent to the axis D—D, upon which mower unit B pivots up and down. The plane of pulley 301 is through axis D—D and when the unit B pivots up and down, the plane of pulley 301 likewise pivots about axis D—D. The tension side of the V-belt, arranged over pulleys 217 and 301, is along the line T—T and accordingly, the V-belt, on the tension side, always enters pulley 217 exactly in line with that pulley, regardless of the position in which pulley 301 may be disposed due to upward or downward swinging movement of mower unit B. Likewise, the V-belt will enter the lower side of pulley 301, exactly in line with that pulley regardless of the angular position in that pulley.

From another viewpoint, pulley 301 and the lower part of V-belt 300 below pulleys 217 and 301 may be considered as always in one plane, and pulley 217 and the upper part of V-belt 300 may be considered as always in another plane. The plane of pulley 301 pivots about the line D—D, which lies in the plane of pulley 217. This has the effect (1st) of always keeping the entering side of the belt in the plane of the pulley it enters, and (2d) of maintaining the belt tension constant. This is an important feature of the invention because the V-belt thereby is spared the wear incident to entering a pulley out of line under loaded conditions, and is prevented from jumping either pulley.

Precisely, the same arrangement of pulley is provided for mower unit C and therefore power is transmitted constantly to mower units B and C regardless of their inclination with respect to the sub-frame 200. It has been found that with this arrangement, it is possible to transmit full power to the mowing units B and C even when they are displaced as much as 60 degrees above and below horizontal position, and that even under such extreme conditions of displacement, sufficient power can be transmitted to stall the gasoline driving engine 60, as may occur when exceptionally heavy growth is being cut.

As another feature of the V-belt drive between the sub-frame 200 and the mowing units B and C, it is desired to be pointed out that the adjustment nuts 256 may be changed by varying the position of grooves 254 and 255 with respect to the mowing unit frame members 258 and 141, and by this means the tension of the V-belts may be adjusted. The tension is adjusted so that under normal running conditions, the V-belt runs relatively high up in the groove of the pulleys and due to this fact, when the revolving reel of either of the mowing units B and C strikes hard obstructions such as a rock or nail, the belt will slip in the pulley. However, where the load is gradually increased upon the cutting reel, as during encountering exceedingly tough growth, the V-belts will tend to pull deeper and deeper into the V of the pulleys and as a result, under such conditions, a very much greater amount of torque can be transmitted than where the units are running under relatively lightly loaded conditions. Therefore, the V-belt drive to units B and C is an inherent safety factor preventing destruction of the revolving reels and bed knife where an exceptionally hard object is encountered.

*Transporting condition of the mowers and removal of mowing units B and C*

In order to transport the mowing machine, the operator manipulates lever 185 on steering column 52 from the full line to the dotted line position shown in Figure 4 thereby elevating the front mowing unit A to the dotted line position. Mowing units B and C are then swung upwardly to the vertical position shown in Figure 11, the V-belts preferably being removed during this extreme condition. Each of the mowing units is provided with an upwardly and inwardly extending bracket arm 308, which is apertured as shown at 309. The fixed steering column 52 is provided with a cross-bar 310 at its upper ends, the outer ends of which are turned down so as to provide an extending portion 311 of smaller diameter at each side. Beneath the cross bar 310 and extending beyond either end thereof, there is a spring clip 312. When the mowing units B and C are in the vertical position shown in Figure 11, the apertures 309 move into position over the extending portions 311 of the cross bar, and the spring clips 312 catch the innermost end of the arms 308 and retain them against outside displacement. In this elevated condition, all of the weight of the mowing units B and C is carried in part by the cross bar 310, and thence through the steering column 52 to the frame member 28, and in part by the link chain 217 which serves to apply an upward force on the sub-frame 200 and hence upon the mowing units. It will be observed that in the position shown in Figure 11, the mowing units have an over-all width within the outside dimensions of the main traction vehicle, and the machine may accordingly be taken through very narrow gates.

When it is desired to remove either of the mowing units B and C, it is only necessary to elevate the retaining clips 260 and 270 whereupon the units B and C may be moved backwardly so as to disengage the pivot pins 202 and 253 from the pivot blocks 248 and 250 (for mowing unit B) or the corresponding parts for mowing unit C. In this way, either of the mowing units may be readily disassembled from the machine for repair and servicing.

All of the ball and socket joint connections, for example, those on the U-frame member 150 and mowing unit A, and those by means of which links 151 and 152 of mowing unit A, and links 228—230 and Y-frame 239 by means of which sub-frame 200 is connected to the frame, are all preferably made with a rubber liner between the socket and the ball of the joint. In order to achieve this construction, the joint is composed of two halves 302 and 303 (see the front ball and socket joint of link 151, Figure 4), which are bolted together by means of a cap screw 304 joining the front ends of the socket and a through bolt 306 which clamps together the back ends of the socket, and at the same time clamps the socket to the link. The half portion of the ball and socket joint, illustrated at 234 in Figure 9, is shown as having a lining 307, which is preferably made of natural or synthetic rubber. The lining serves to provide a relatively solid and yet resilient coupling at each of the joints.

Along the front and side portions of the mowing unit A and along the front and outer ends of mowing units B and C, there are provided spring bumpers 313, 314 and 315, which are preferably encased in rubber hose so as to provide a soft and resilient cushion, which will serve to prevent the mowing machine from chipping or otherwise damaging monuments, curbs, trees, etc., against which it may accidently be driven.

Many obvious variations may be made in the apparatus herein described and illustrated, without departing from the spirit of the invention claimed.

What I claim is:

1. A power mower comprising a self-propelled wheel supported frame, said frame being composed of a U-shaped member, a transverse member secured at its extremities to the open ends of said U-shaped member, a longitudinal mid-frame member extending rearwardly from said transverse member, and a plurality of mower units flexibly attached to the frame for movement with the same along an undulating surface.

2. A power mower comprising a wheel supported frame, propelling means for the frame supported thereon, and a plurality of mower units flexibly attached thereto, said frame being composed of a U-shaped plate member, a transverse tubular member secured at its extremities to the open ends of said U-shaped plate member, a longitudinal tubular member extending rearwardly from said transverse member and secured at its forward end thereto in a position midway between the ends thereof.

3. A power mower comprising a main frame having a U-shaped member, a transverse member connecting the open end of the U-shaped member, a longitudinal member secured to said transverse member at its midpoint and extending rearwardly therefrom, a rigid vertical pivot member secured to the longitudinal member, a two-wheel support for the front part of said frame, a rear wheel support pivotally attached to the frame at said rigid vertical pivot member, and an operator supporting means carried on the rear wheel support.

4. A power mower, comprising a main supporting frame, a front mower unit, a pair of wing mower units, said wing mower units being combined in overlapping arrangement with respect to the front mower so as to cut a swath of grass substantially three times the width of one unit, means pivotally connecting the front mower unit to the main frame for translatory movement in a vertical plane and for tipping movement about an axis longitudinally of the frame, a sub-frame, means mounting the sub-frame to the main frame for translatory movement in a vertical plane and for tipping movement about an axis longitudinally of the frame, and means pivotally connecting each of the wing mowers to the sub-frame for swinging movement in a transverse vertical plane.

5. A power mower, comprising a main frame, wing mower units extending sideways from said frame, means mounting said mower for translatory movement in a vertical plane and for rocking movement about an axis longitudinally of the frame, adjustable yieldable means for transferring a portion of the mower weight to the main frame, the transfer of weight being substantially constant throughout a plurality of mower positions relative to the frame, said means being moveable to elevate the mower for transport.

6. A power mower, a main frame, a pair of wing mowers, a sub-frame, means pivotally attaching the wing mowers to the sub-frame for swinging movement of each in a vertical plane transversely of the main frame, constant torque means to yieldably transfer a portion of wing mower weight to the sub-frame, means pivotally attaching the sub-frame to the main frame for translatory movement in a vertical plane and for rocking movement about an axis longitudinally of the main frame, adjustable yieldable means for constantly transferring to the main frame all of the sub-frame and wing mower weight save that necessary to maintain the proper contact of the wing mowers with the ground.

7. A power mower, a main frame, a mower unit in front of the frame, connections means pivotally connecting the mower unit and main frame, including a three-point pivotal connection on the mower, and a four-point pivotal connection on the frame.

8. A power mower, comprising a main frame, a sub-frame, a pair of wing mowers pivotally connected to the sub-frame along axes longitudinally of the main frame, and means connecting the sub-frame to the main frame including an arm pivoted on the main frame for movement in a vertical plane, said arm being universally connected to the sub-frame, and means for holding the sub-frame from pivotally moving about a transverse axis.

9. A power mower, comprising a main frame, a sub-frame, a pair of wing mowers pivotally conected to the sub-frame along axes longitudinally of the main frame, and means connecting the sub-frame to the main frame including an arm pivoted on the main frame for movement in a vertical plane, said arm being universally connected to the sub-frame, and means for holding the sub-frame from pivotally moving about a vertical axis.

10. In a lawn mower, a drive pulley, a driven pulley, a driving connection comprising an endless belt which rides on both pulleys, means mounting the pulleys for relative swinging movement of the planes of the pulleys about a line substantially tangent to the pitch lines of the pulleys on the tight belt side of one pulley and the loose belt side of the other pulley.

11. A lawn mower, a frame, a drive pulley mounted for rotation in a plane fixed with respect to the frame, a mower unit, a driven pulley mounted for rotation in a plane fixed with respect to the mower unit, an endless belt mounted for running on the pulleys, means pivotally mounting the mower unit for swinging movement with respect to the frame, the pivotal axis of said mounting means being tangent to approximately the pitch circle of one pulley on one side of the belt, and tangent to approximately the pitch circle of the other pulley on the other side of the belt.

12. A device of the type set forth in claim 11 including means for moving the pulleys away from each other longitudinally for regulating the tension of said belt.

13. A power mower, comprising a main frame having a power unit thereon, a sub-frame, means mounting the sub-frame on the main frame for translatory movement in a vertical plane and for rocking movement about an axis longitudinally of the frame, a counter-shaft having a pulley thereon journaled on the sub-frame along an axis normally transverse to the main frame, driving means connecting the power unit and the counter-shaft, a wing mower, a pulley mounted on the wing mower, an endless belt connecting the pulley of the sub-frame and the pulley of the wing mower, means pivotally mounting the wing mower for swinging movement with respect to the sub-frame, said pivotal axis being tangent to the pitch line of one pulley on one side of the belt and tangent to the pitch line of the other pulley on the other side of the belt.

14. A power mower, comprising a frame, motor means thereon, a power drive shaft rotatably mounted on said frame, and power transmitting means connecting said shaft to the motor means, a pair of pulleys mounted in spaced relation on said drive shaft, a mower having rotating reels thereon mounted with the axes of the reels in planes parallel to the drive shaft, a drive pulley on the rotating reel of each mower, means mounting the mower units for swinging movement in vertical planes, the axis of swinging of each mower being through the pitch line of the pulley of that mower on one side of the belt and through the pitch line of the corresponding pulley of the drive shaft on the other side of the belt.

15. A mowing machine, comprising a frame, a mowing unit carried thereby, a pivot journal and an extending pivot shaft for insertion in the journal, both having their pivot axes longitudinally aligned parallel with the frame, one being upon the frame and the other on the mowing unit, whereby the mowing unit may be readily attached to the frame by insertion of the pivot shaft endwise in the pivot journal.

16. A device of the type described in claim 15 characterized by the fact that the shaft includes a shoulder, and there is a manually moveable clip engageable with the shoulder for holding the shaft against longitudinal movement.

17. A device of the type set forth in claim 15 characterized by the fact that both the frame and mowing units include pulleys having a power transmitting belt thereover and by the fact that the shaft is endwise adjustable to vary the belt tension.

18. A power mower, including a main frame, a sub-frame, a pair of wing mowers mounted on the sub-frame and normally extending laterally therefrom, said wing mowers being pivoted to the sub-frame for swinging movement to a vertical position, and means on the frame releasably holding the mowers in said vertical position.

19. A power mower comprising a main frame with a power supplying shaft journaled thereon, a plurality of cutter operating shafts generally parallel to said power supplying shaft, a support for one of said cutter operating shafts floatingly engaged to the main frame, wheels on said three shafts located in alignment, and flexible strands of transmitting means engaged thereon, the rotation of said means being such that tension in one strand from said power supplying shaft operates the floatingly supported shaft and tension in another strand from the floating shaft operates the third shaft, and link means for floatingly engaging said support to said frame extending in the direction of the resultant of the tensions in said two strands.

20. A power mower, a frame, a mower unit in spaced relation with the frame, link means pivotally connecting the mower to the frame for translatory movement in a vertical plane and for movement about an axis longitudinally of the frame, other link means pivoted to the frame and to the mower for tilting the mower upwardly about an axis transverse of the frame when the mower rocks vertically above and below a normal horizontal plane with respect to the frame.

21. A power mower, comprising a frame, a power supplying shaft rotatably mounted on the frame, a mower unit having a rotating reel and reel shaft arranged so as to be normally generally parallel with said power supplying shaft, pulleys on the power shaft and reel shaft, power transmitting belt means tensioned over said pulleys, stay link means extending from the frame to the mower unit for maintaining them in spaced relation, said link means being in arrangement so that the direction of forces thereby transmitted are substantially parallel to the resultant of the belt tension forces.

22. A power lawn mower, comprising a tractor structure and a cutter structure with independent ground contacts, three universal pivots displaced laterally and vertically on one of said structures, a transverse axis on the other of said structures horizontally displaced from one of said pivots, a swing frame pivoted on said axis and connected to the said one of the universal pivots, fourth and fifth universal pivots on the structure that supports said axis and displaced in the direction of travel from the other two of said three pivots, and links disposed generally in the direction of travel connecting the respectively aligned pivots on said tractor structure and cutter structure.

23. In a power lawn mower, a tractor unit comprising ground supported rolling member, a frame carried thereby, and a motor thereon connected to operate said rolling member, a cutter structure with ground contact disposed transversely to the direction of travel and floatingly connected to said tractor, said floating connection comprising a swing frame pivoted to the tractor on a transversely disposed axis and universally connected to the cutter structure at a point horizontally displaced from said axis, and means adapted to constrain said cutter structure to move in a substantially vertical plane, whereby said universal connection prevents lateral movements of said cutter structure relatively to said tractor.

24. In a power lawn mower, a tractor unit comprising ground supported rolling member, a frame carried thereby, and a motor thereon connected to operate said rolling member, a cutter structure with ground contact disposed transversely to the direction of travel and floatingly connected to said tractor, said floating connection comprising a swing frame pivoted to the tractor on a transversely disposed axis and universally connected to the cutter structure at a point horizontally displaced from said axis, and means including plural pivots disposed on a transverse axis of said cutter structure vertically displaced from said universal connection, other pivots on the tractor and horizontally displaced from the first said pivots and from the axis thereof, and universally connected links disposed in the direction of travel connecting the respective pivots on said cutter structure and on said tractor.

RALPH W. SPEISER.